(12) United States Patent
Bang et al.

(10) Patent No.: US 11,772,088 B2
(45) Date of Patent: Oct. 3, 2023

(54) POROUS CORE-SHELL CATALYST AND METHOD FOR FABRICATING THE SAME

(71) Applicant: INDUSTRY-UNIVERSITY COOPERATION FOUNDATION HANYANG UNIVERSITY ERICA CAMPUS, Ansan-Si (KR)

(72) Inventors: Jin Ho Bang, Ansan-si (KR); Min Soo Kim, Ansan-si (KR)

(73) Assignee: INDUSTRY-UNIVERSITY COOPERATION FOUNDATION HANYANG UNIVERSITY ERICA CAMPUS, Ansan-Si (KR)

( * ) Notice: Subject to any disclaimer, the term of this patent is extended or adjusted under 35 U.S.C. 154(b) by 0 days.

(21) Appl. No.: 17/198,338

(22) Filed: Mar. 11, 2021

(65) Prior Publication Data

US 2021/0283590 A1    Sep. 16, 2021

(30) Foreign Application Priority Data

Mar. 11, 2020  (KR) .................. 10-2020-0029999

(51) Int. Cl.
| | |
|---|---|
| *B01J 27/043* | (2006.01) |
| *B01J 35/00* | (2006.01) |
| *B01J 37/00* | (2006.01) |
| *B01J 23/75* | (2006.01) |
| *B01J 37/20* | (2006.01) |

(52) U.S. Cl.
CPC .......... *B01J 37/0072* (2013.01); *B01J 23/75* (2013.01); *B01J 27/043* (2013.01); *B01J 35/002* (2013.01); *B01J 35/008* (2013.01); *B01J 37/20* (2013.01)

(58) Field of Classification Search
CPC ...... B01J 23/475; B01J 27/043; B01J 35/008; B01J 37/20
See application file for complete search history.

(56) References Cited

U.S. PATENT DOCUMENTS

| | | | | |
|---|---|---|---|---|
| 2014/0205898 | A1* | 7/2014 | Lee | H01M 4/1391 427/126.6 |
| 2014/0302323 | A1* | 10/2014 | DiSalvo | C01B 21/062 423/385 |

FOREIGN PATENT DOCUMENTS

| | | | | |
|---|---|---|---|---|
| CN | 109745929 A | * | 5/2019 | |
| JP | 6315532 B1 | * | 4/2018 | ............ B01J 27/051 |
| KR | 10-2011-0108871 A | | 10/2011 | |
| KR | 10-1406427 B1 | | 6/2014 | |

(Continued)

OTHER PUBLICATIONS

Machine translation of CN-109745929-A, publication date May 14, 2019.*

(Continued)

*Primary Examiner* — Jun Li
(74) *Attorney, Agent, or Firm* — FINCH & MALONEY PLLC

(57) ABSTRACT

Provided is a method of manufacturing a porous core-shell catalyst structure. The method of manufacturing a porous core-shell catalyst structure includes preparing a bulk metal oxide; providing a first reaction gas containing nitrogen to the bulk metal oxide to prepare an intermediate product containing a porous metal oxide; and providing a second reaction gas containing sulfur to the intermediate product to prepare a core-shell catalyst structure including a core formed of the porous metal oxide and a shell formed of metal sulfide.

13 Claims, 15 Drawing Sheets

(56) References Cited

FOREIGN PATENT DOCUMENTS

KR    10-2016-0040016 A      4/2016
KR       20190063289 A   *  6/2019

OTHER PUBLICATIONS

Machine translation of JP-6315532-B1, publication date Apr. 25, 2018.*
Machine translation of KR-20190063289-A, publication date Jun. 7, 2019.*

* cited by examiner

[Fig. 1]
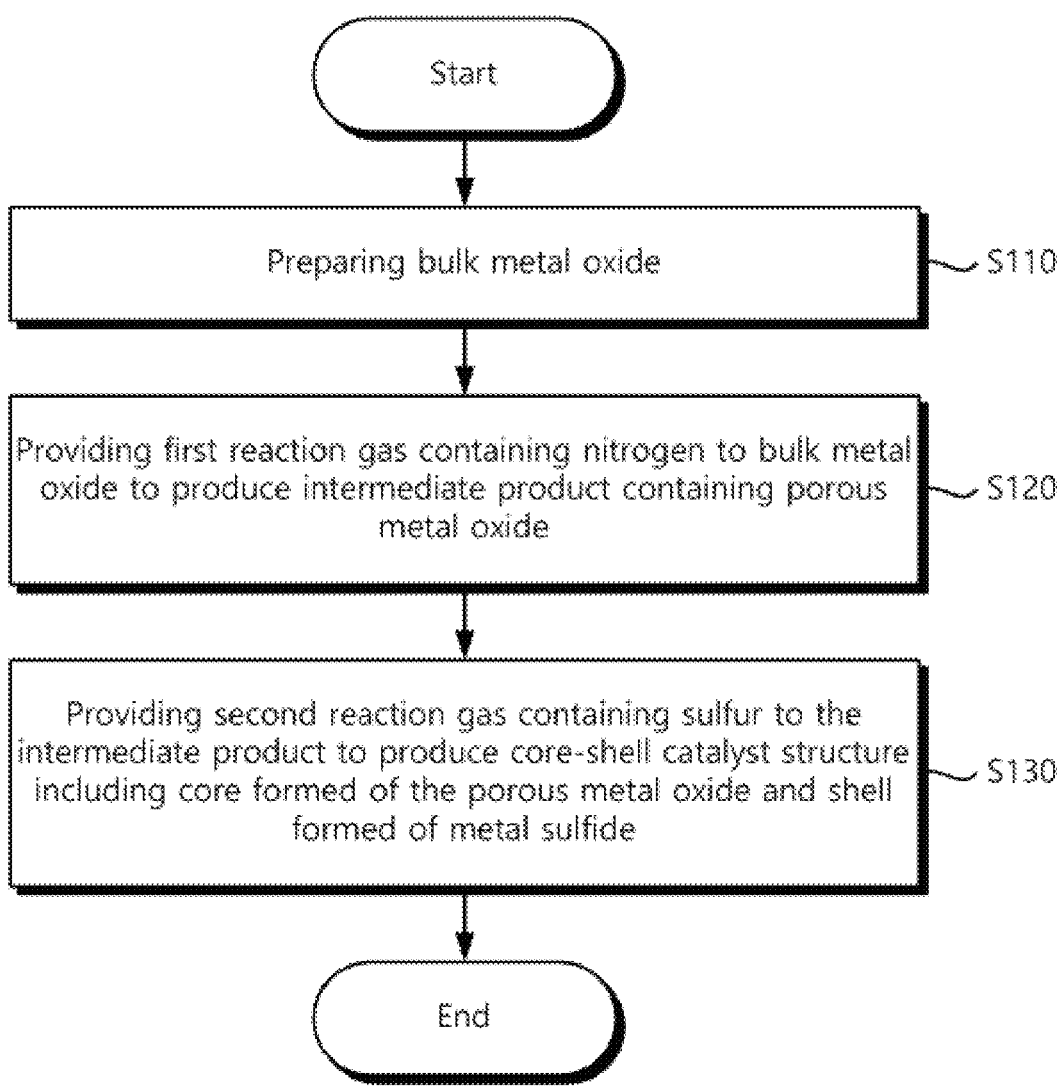

[Fig. 2]
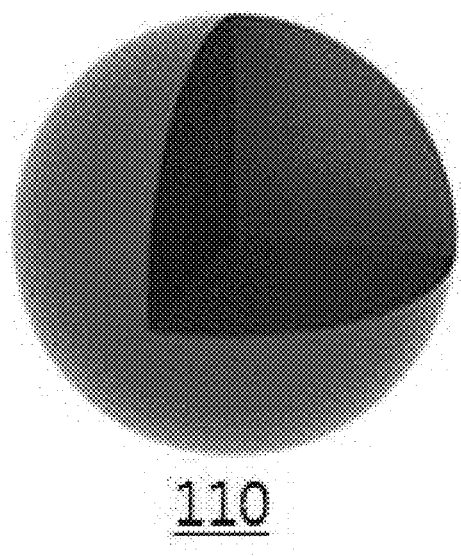
110
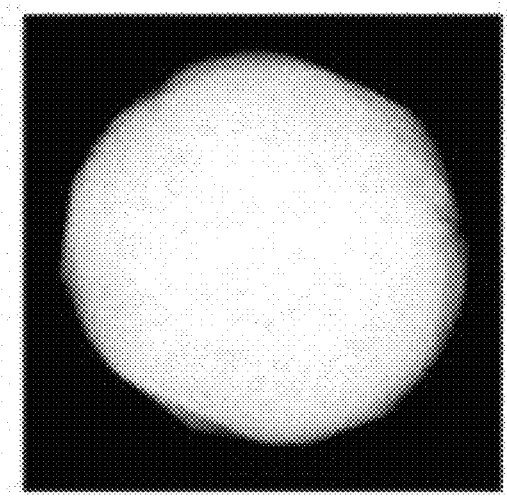

[Fig. 3]
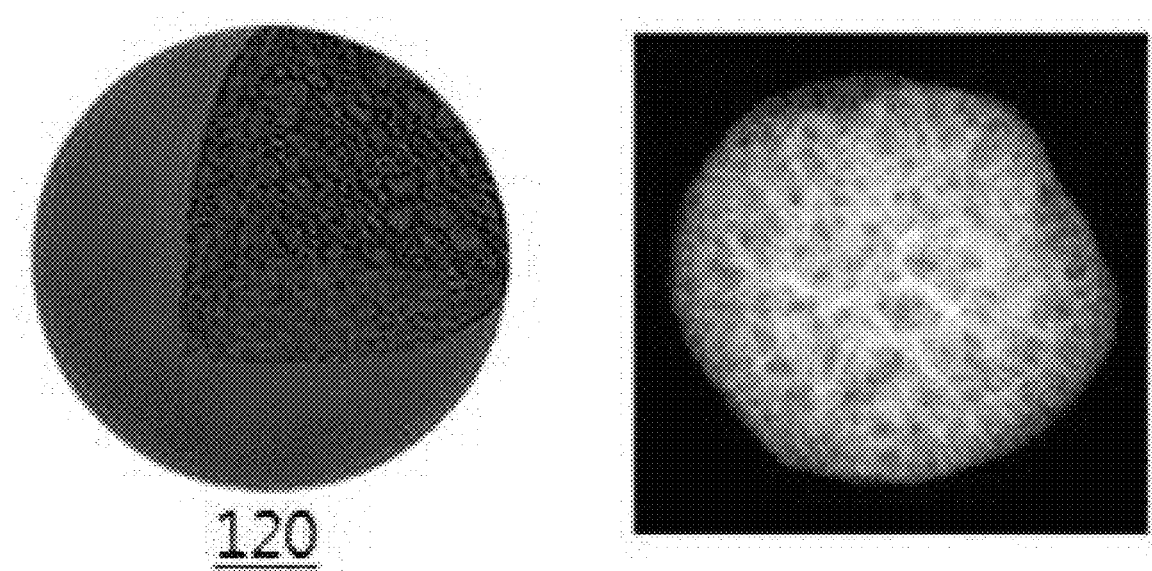

[Fig. 4]
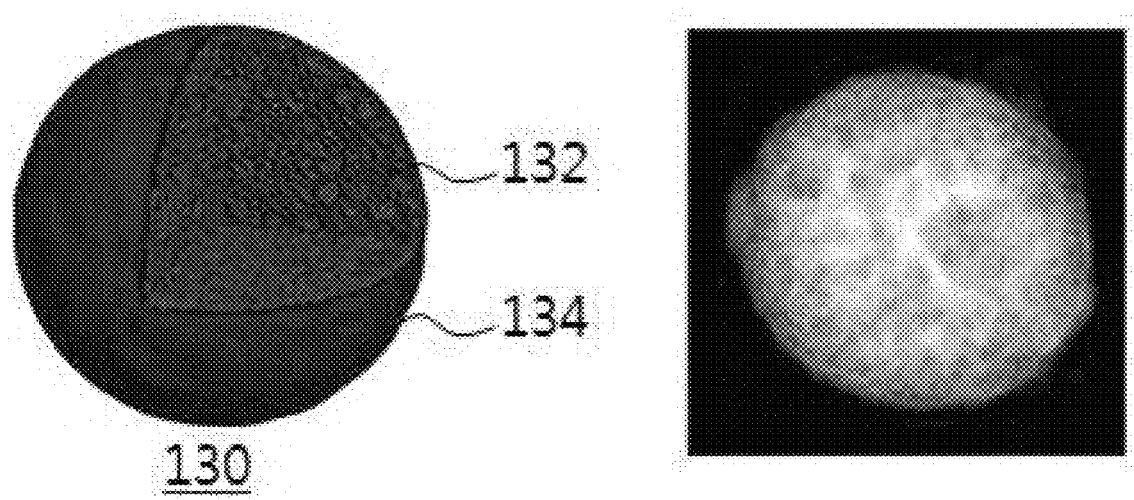

[Fig. 5]
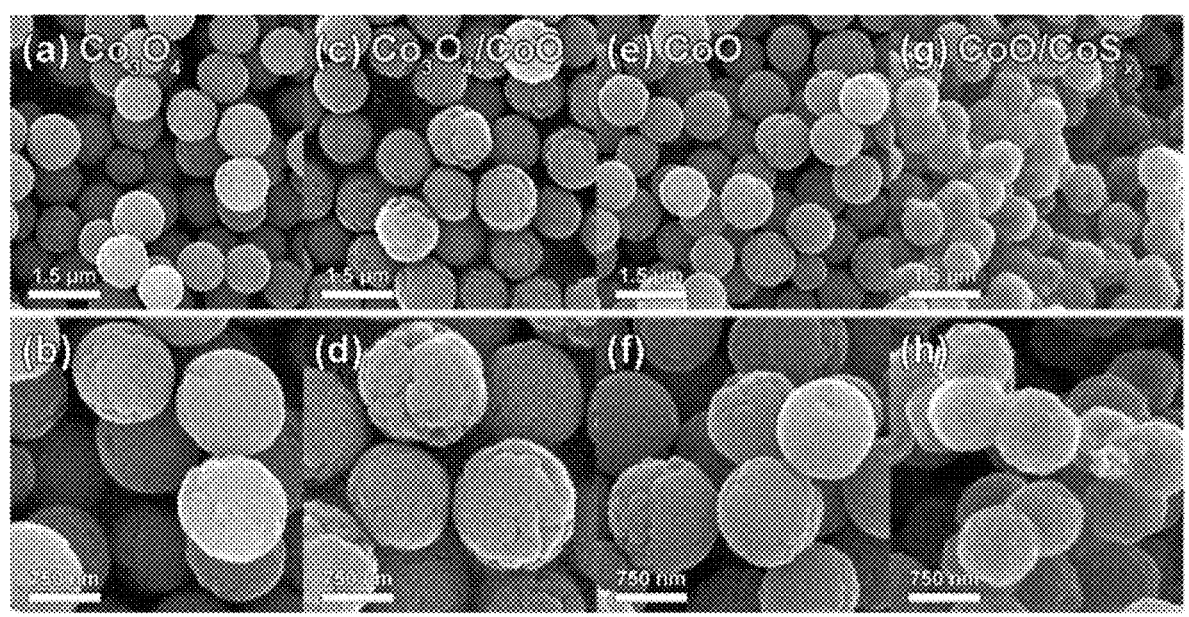

[Fig. 6]
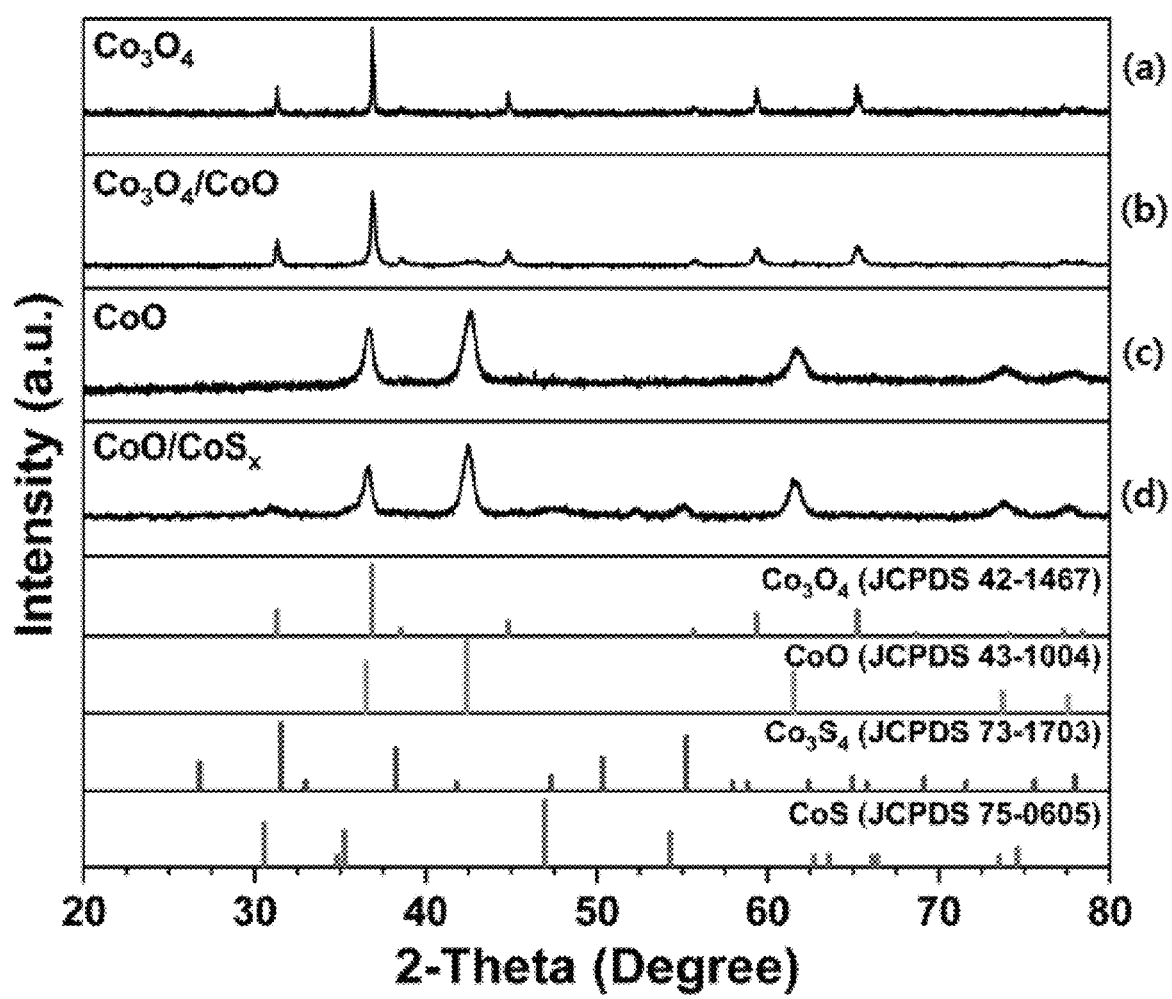

[Fig. 7]
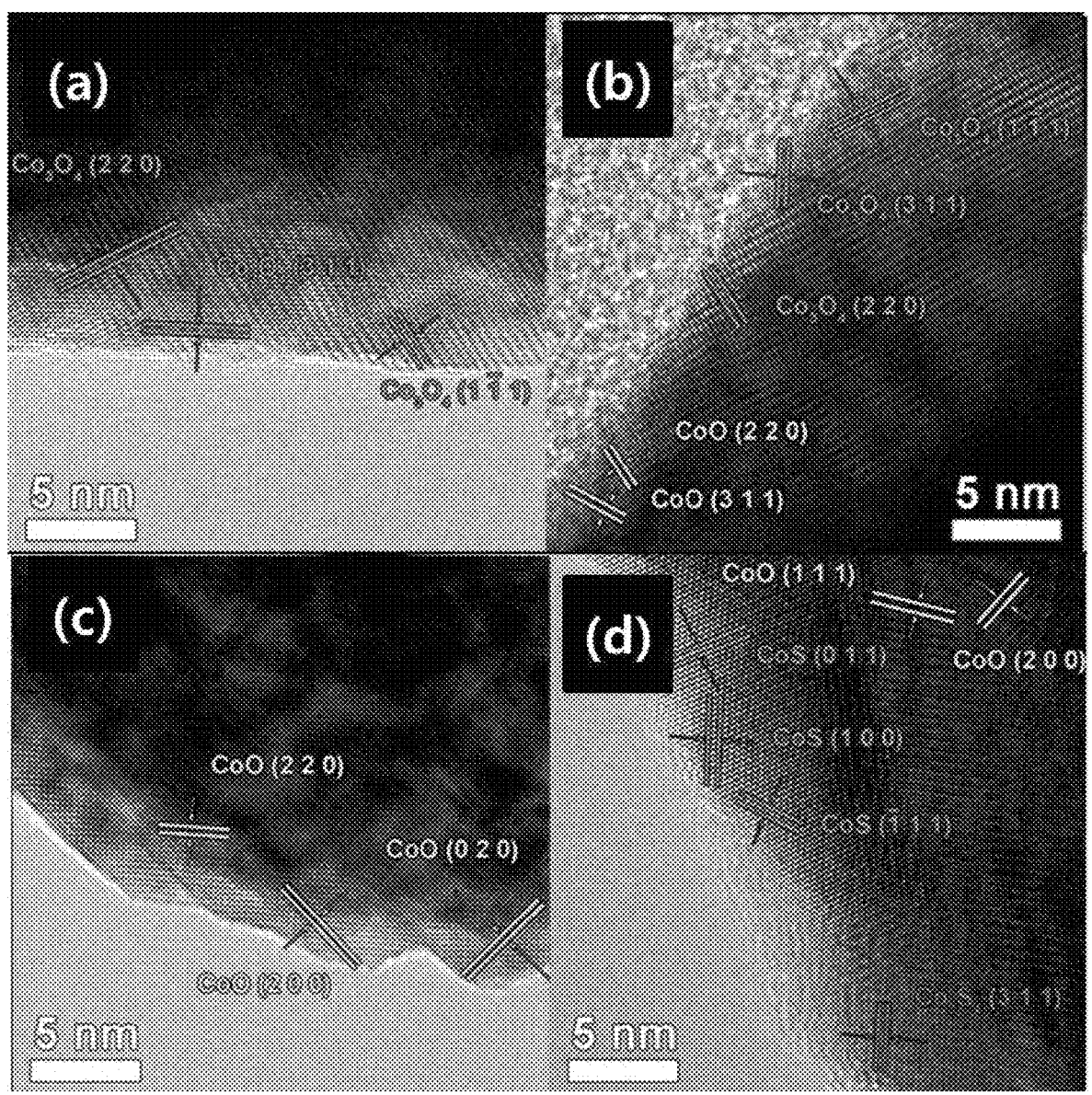

[Fig. 8]
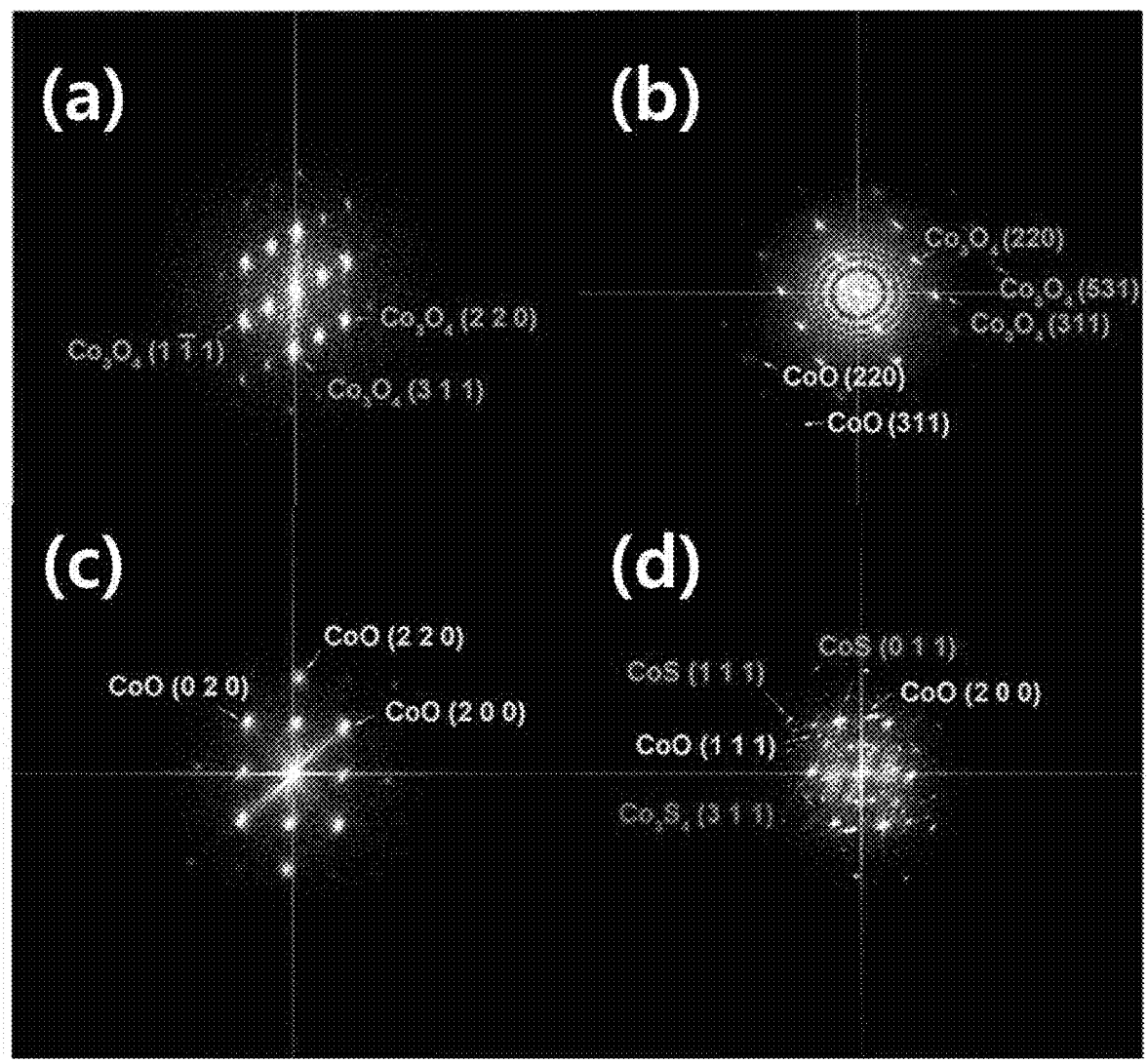

[Fig. 9]
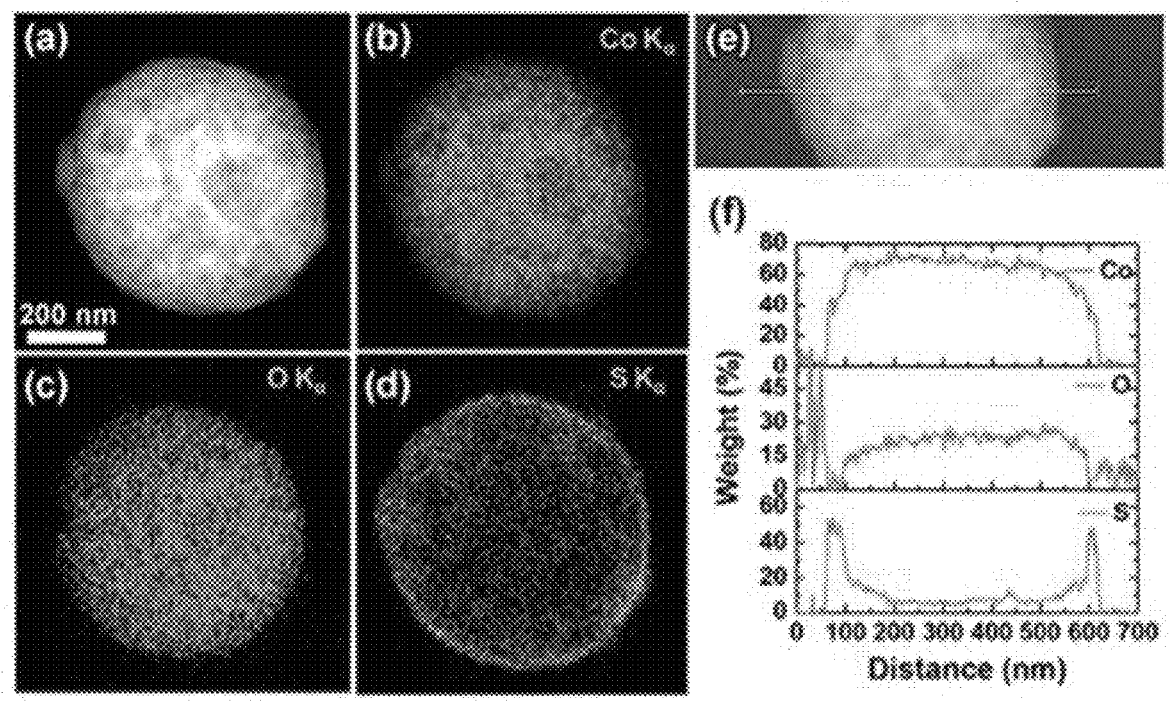

[Fig. 10]
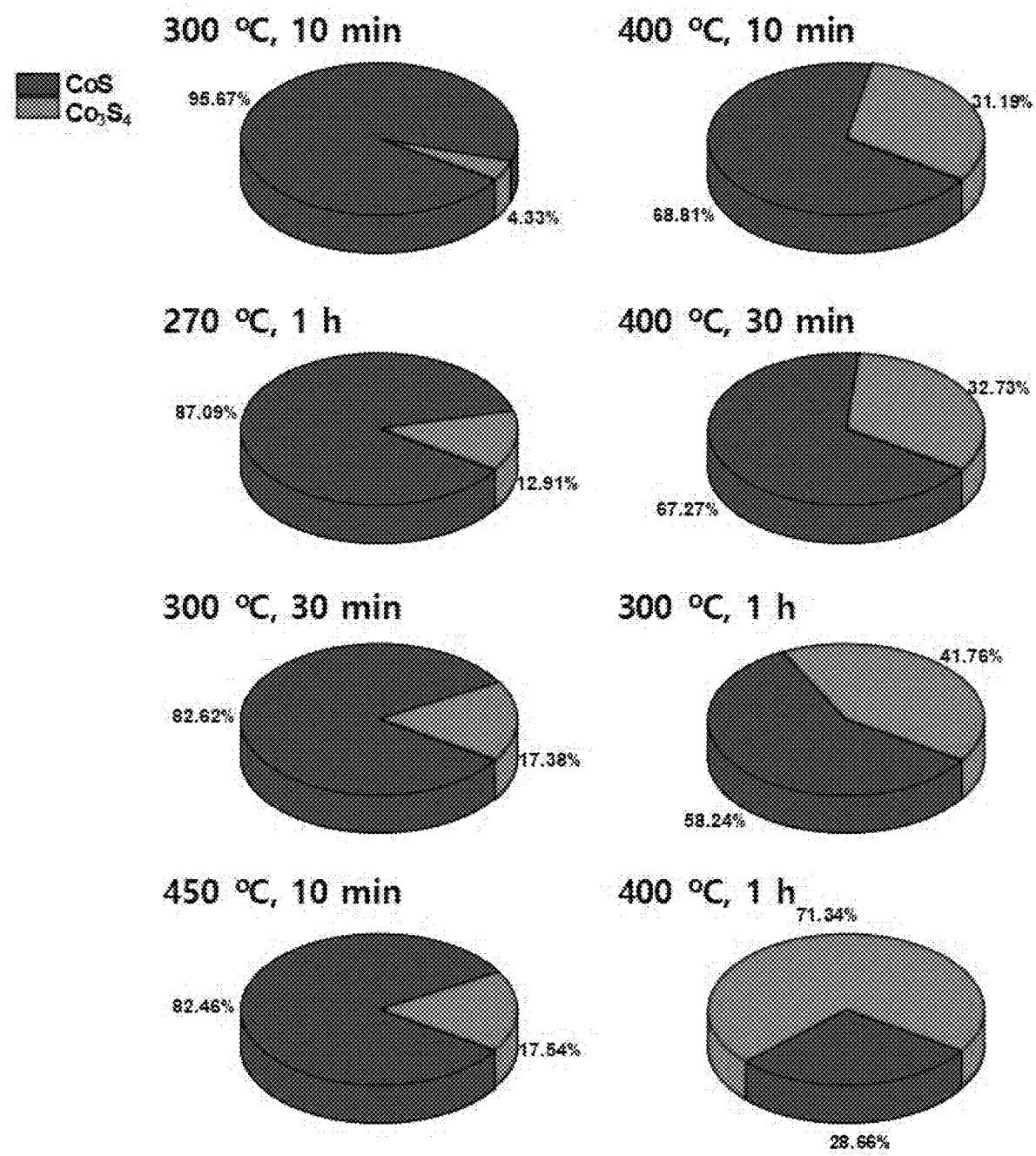

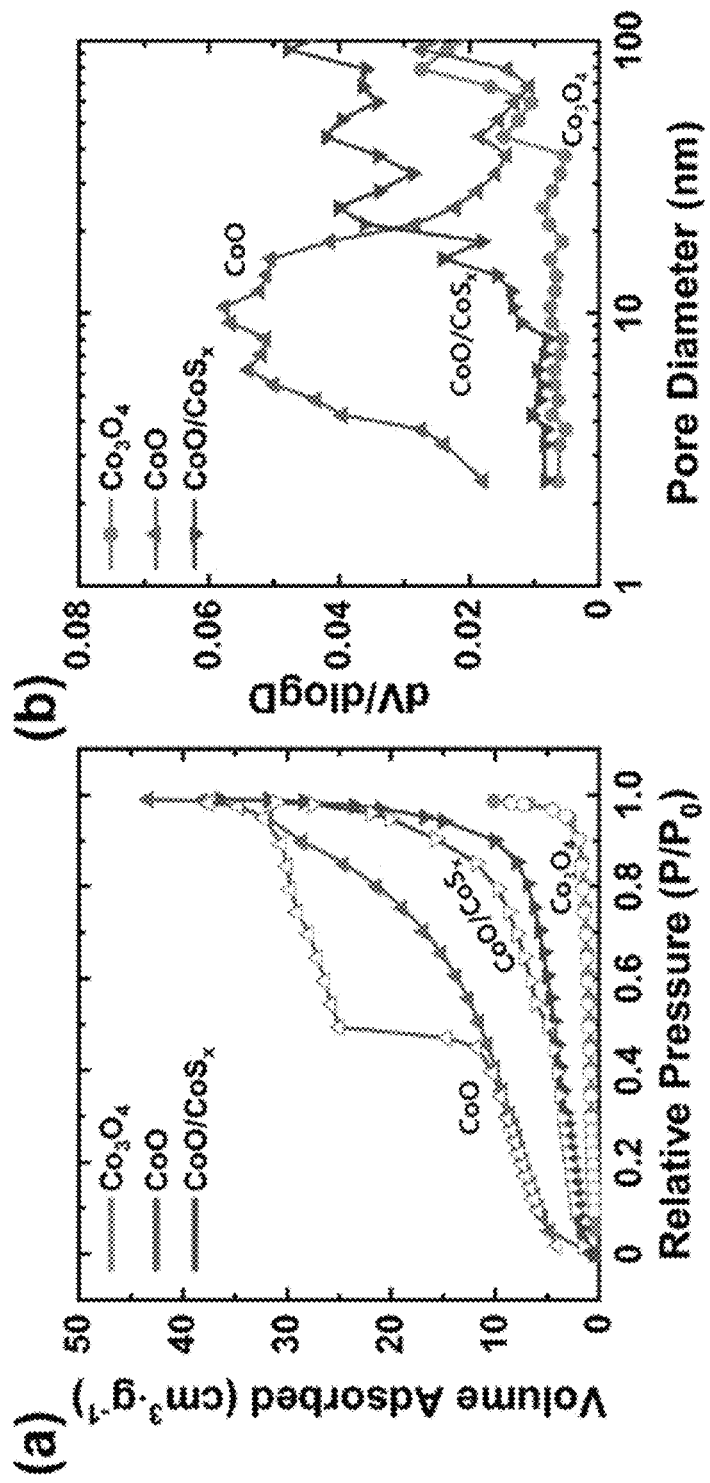
[Fig. 11]

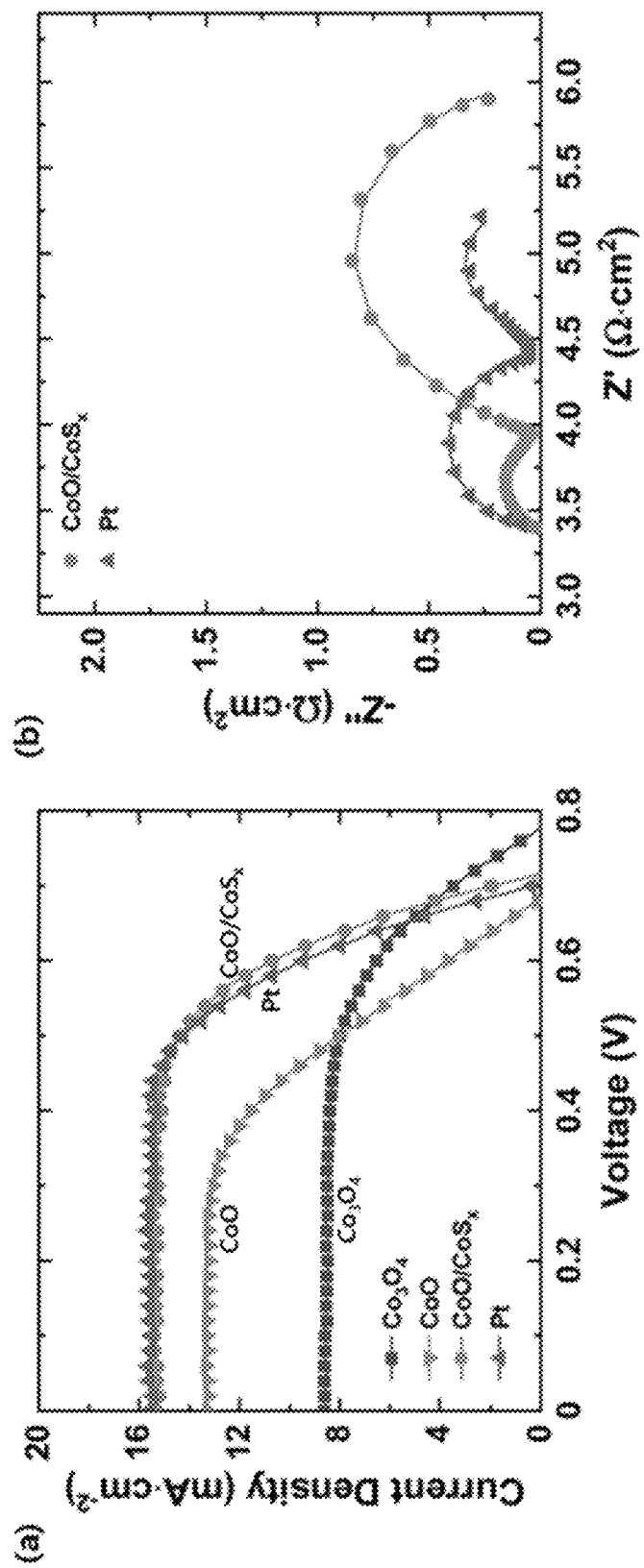
[Fig. 12]

[Fig. 13]
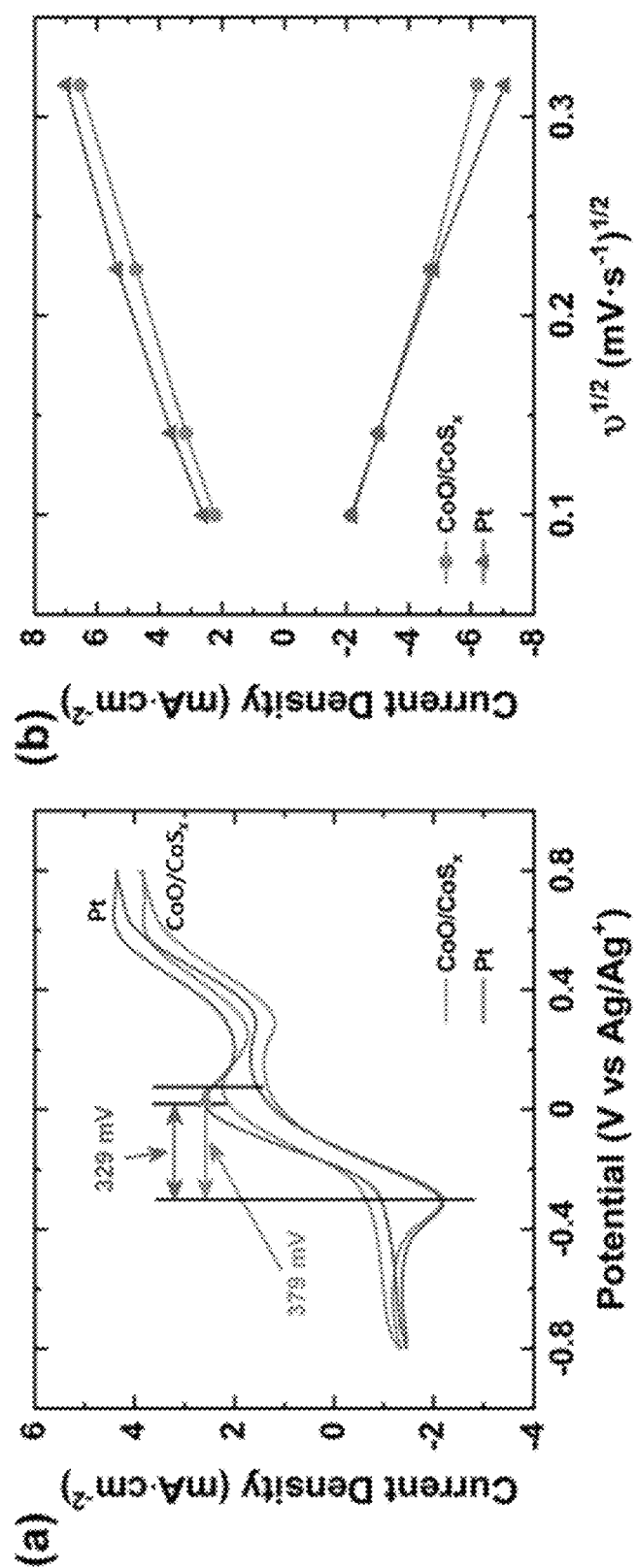

[Fig. 14]
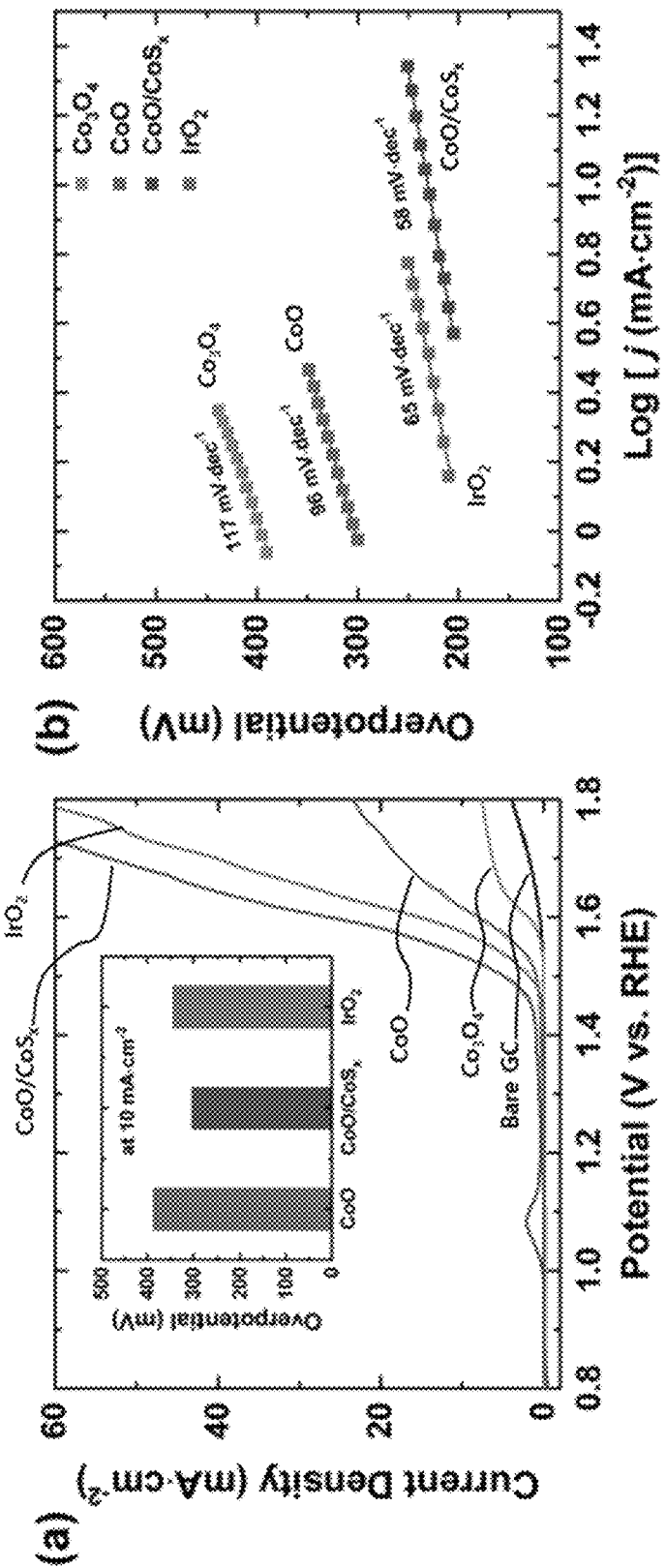

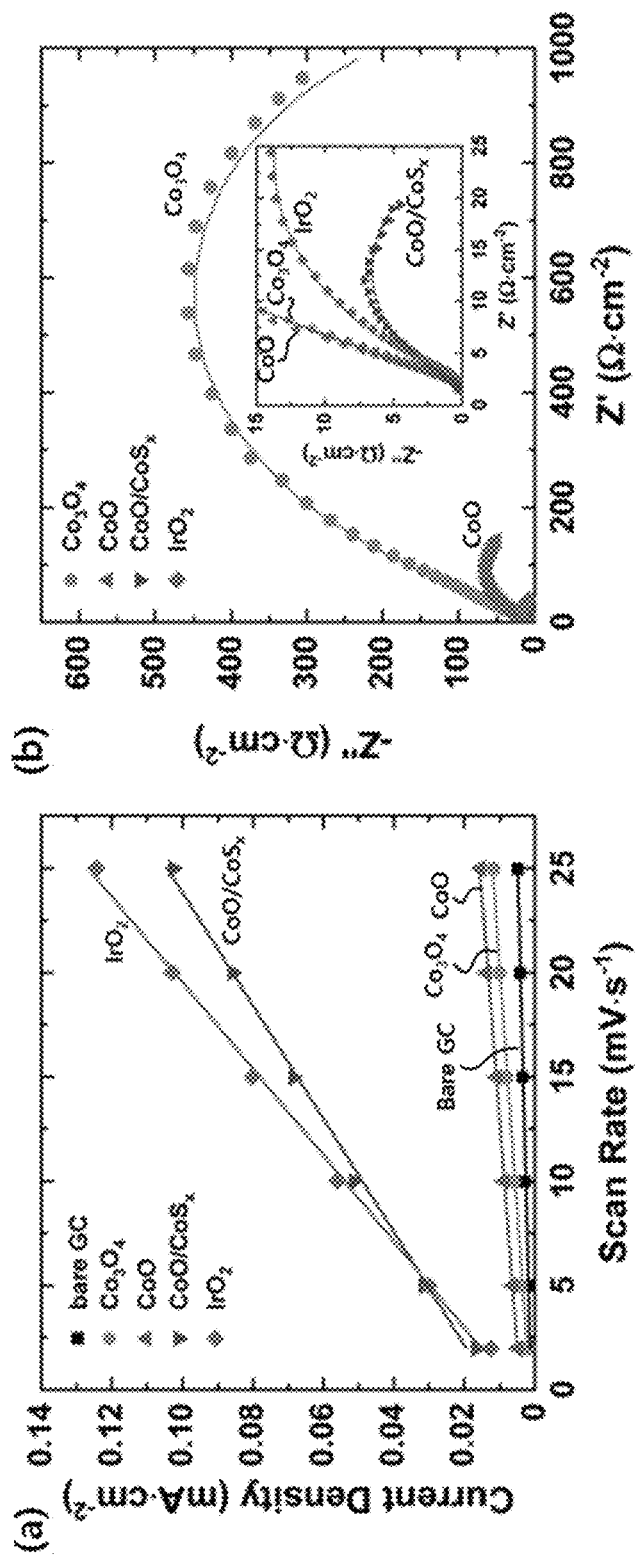
[Fig. 15]

POROUS CORE-SHELL CATALYST AND METHOD FOR FABRICATING THE SAME

BACKGROUND

The present application relates to a porous core-shell catalyst structure and a method of manufacturing the same, and more particularly, to a porous core-shell catalyst structure including a core formed of a porous metal oxide and a shell formed of a metal sulfide and a method of manufacturing the same.

Catalysts are involved in the production of chemicals that are very important in the industry. Similarly, the most important process in the biochemical field is catalysis. Research on catalysts is a major field of applied science, and is particularly applied to numerous chemistry fields such as organometallic chemistry, materials science, and the like. Catalysts are related to numerous parts of environmental science, such as catalytic converters in vehicles and ozone holes. Catalytic reactions are preferred in environmentally friendly green chemistry because the amount of waste produced can be reduced. To the contrary, in case of stoichiometry, all reactants are consumed so that more by-products are generated. Numerous transition metals and transition metal compounds are also used for catalysts.

The catalyst refers to a material that changes a reaction rate without being consumed in the reaction process. Even a small amount of catalyst may affect the reaction rate. In general, the reaction occurs faster with a catalyst because less activation energy is required. In the catalytic reaction structure, the catalyst generally reacts to form a temporary intermediate material and then undergoes a cyclical process of regenerating the original catalyst. In the energy field, high-capacity batteries, hydrogen vehicles, and catalysts for fuel cells have been developed. In order to use electricity instead of petroleum as an energy source for an automobile, it is required to further increase the battery capacity, and advanced countries are conducting electrode catalyst research to develop catalysts that increase the reaction rate. In Korea, research on electrode catalysts has been conducted mainly by research institutes and universities.

Accordingly, various techniques for manufacturing a catalyst capable of improving the efficiency of a battery have been studied. For example, in Korean Registered Patent No. KR 10-1406427 (Application No. KR 1020130049631, Applicant: POSCO Co., Ltd.), there have been disclosed a conductive polymer-carbon composite electrode for a dye-sensitized solar cell, which has excellent catalytic activity and electrical conductivity that may be used as a catalyst electrode for a dye-sensitized solar cell, a dye-sensitized solar cell using the same, and a method of manufacturing the same, wherein the method of manufacturing a conductive polymer-carbon composite electrode for a dye-sensitized solar cell includes the steps of: dispersing a conductive polymer in a first solvent to obtain a first solution, dispersing a carbon material in a second solvent to obtain a second solution, mixing the first solution and the second solution to obtain a composite solution in which the carbon material and the conductive polymer are dispersed, and heat-treating the composite solution at 100° C. to 150° C. to obtain a composite electrode. In addition, technologies, which related to a battery catalyst structure and a method of manufacturing the same, have been continuously studied.

SUMMARY

To solve technical problems, one object of the present disclosure is to provide a porous core-shell catalyst structure having improved electrical conductivity and a method of manufacturing the same.

Another object of the present disclosure is to provide a porous core-shell catalyst structure having a high active surface area and a method of manufacturing the same.

Still another object of the present disclosure is to provide a porous core-shell catalyst structure having high stability and a method of manufacturing the same.

Still another object of the present disclosure is to provide a porous core-shell catalyst structure of which the manufacturing process is simplified and a method of manufacturing the same.

Still another object of the present disclosure is to provide a porous core-shell catalyst structure of which the manufacturing cost is reduced and a method for manufacturing the same.

Still another object of the present disclosure is to provide a porous core-shell catalyst structure having high reliability and a method of manufacturing the same.

Still another object of the present disclosure is to provide a porous core-shell catalyst structure having a long lifespan and a method of manufacturing the same.

Still another object of the present disclosure is to provide a porous core-shell catalyst structure having a high quality and a method of manufacturing the same.

The objects of the present disclosure are not limited to those described above.

To achieve the above-described objects, the present disclosure provides a method of manufacturing a porous core-shell catalyst structure.

According to an embodiment, a method of manufacturing a porous core-shell catalyst structure may include preparing a bulk metal oxide; providing a first reaction gas containing nitrogen to the bulk metal oxide to prepare an intermediate product containing a porous metal oxide; and providing a second reaction gas containing sulfur to the intermediate product to prepare a core-shell catalyst structure including a core formed of the porous metal oxide and a shell formed of metal sulfide.

According to an embodiment, an oxygen content of the intermediate product may be lower than an oxygen content of the bulk metal oxide.

According to an embodiment, the bulk metal oxide may include a bulk cobalt oxide, the core includes a porous cobalt oxide, and the shell includes cobalt sulfide.

According to an embodiment, the first reaction gas may include an ammonia gas.

According to an embodiment, the second reaction gas may include a hydrogen sulfide gas.

According to an embodiment, in the core-shell catalyst structure, a ratio of the core and the shell may be controlled by time and temperature with which the second reaction gas is provided to the intermediate product.

To achieve the above-described objects, the present disclosure provides a method of manufacturing a dye-sensitized solar cell.

According to an embodiment, a method of manufacturing the dye-sensitized solar cell may include preparing the porous core-shell catalyst structure according the embodiments, forming a photoelectric conversion layer including an electrode particle and a dye layer adsorbed on a surface of the electrode particle on a first substrate, forming a guide film on a second substrate by pretreating the second substrate with a basic solution, forming an electrode film using the porous core-shell catalyst structure on the guide film, arranging the first substrate and the second substrate so that the electrode film and the photoelectric conversion layer face each other, and injecting an electrolyte solution between the first substrate and the second substrate.

To achieve the above-described objects, the present disclosure provides a porous core-shell catalyst structure According to an embodiment, the porous core-shell catalyst structure may include a core formed of porous cobalt oxide; and a shell covering a surface of the core and formed of cobalt sulfide.

According to an embodiment, the shell may include first cobalt sulfide and second cobalt sulfide having a higher proportion of sulfur than the first cobalt sulfide.

To achieve the above-described objects, the present disclosure provides a dye-sensitized solar cell.

According to an embodiment, the dye-sensitized solar cell may include a photoelectric conversion layer disposed on a first substrate and including an electrode particle and a dye layer adsorbed on a surface of the electrode particle, a second substrate facing the first substrate, an electrolyte solution between the photoelectric conversion layer and the second substrate, and an electrode disposing film between the electrolyte solution and the second substrate and comprising the porous core-shell catalyst structure according to the embodiments.

The method of manufacturing a porous core-shell catalyst structure according to an embodiment of the present disclosure may include preparing a bulk metal oxide; providing a first reaction gas containing nitrogen to the bulk metal oxide to prepare an intermediate product containing a porous metal oxide; and providing a second reaction gas containing sulfur to the intermediate product to prepare a core-shell catalyst structure including a core formed of the porous metal oxide and a shell formed of metal sulfide. Accordingly, there is provided the porous core-shell catalyst structure which has excellent electrocatalytic activity due to the improved electrical conductivity and increased surface area of the porous metal oxide combined with the excellent electrocatalytic activity of the metal sulfide. In addition, the porous core-shell catalyst structure manufactured according to the embodiments of the present disclosure may have higher efficiency than a catalyst using a conventional material as a material for a dye-sensitized solar cell and an oxygen generating reaction electrode.

BRIEF DESCRIPTION OF THE DRAWINGS

FIG. 1 is a flowchart illustrating a method of manufacturing a porous core-shell catalyst structure according to an embodiment of the present disclosure.

FIG. 2 is a view illustrating a bulk metal oxide according to an embodiment of the present disclosure.

FIG. 3 is a view illustrating a porous metal oxide according to an embodiment of the present disclosure.

FIG. 4 is a view illustrating a shell formed of a metal sulfide on the surface of a porous metal oxide according to an embodiment of the present disclosure.

FIG. 5 is a view showing an SEM image for explaining the structure of each operation of synthesizing a porous core-shell catalyst structure according to an experimental example of the present disclosure.

FIG. 6 is a view for explaining the structure characteristics of each synthesis stage of a porous core-shell catalyst structure according to an embodiment of the present disclosure.

FIG. 7 is a view for explaining the particle surface for each synthesis stage of a porous core-shell catalyst structure according to an embodiment of the present disclosure.

FIG. 8 is a view for explaining the structure for each synthesis stage of a porous core-shell catalyst structure according to an embodiment of the present disclosure.

FIG. 9 is a view for explaining the particle distribution of the porous core-shell catalyst structure according to an embodiment of the present disclosure.

FIG. 10 is a view for explaining the weight ratio by temperature and time of the metal sulfide shell of a porous core-shell catalyst structure according to an embodiment of the present disclosure.

FIG. 11 is a view for explaining the characteristics of the structure for each synthesis stage according to an embodiment of the present disclosure.

FIG. 12 is a view for explaining the structure characteristics of each synthesis stage of a porous core-shell catalyst structure according to an embodiment of the present disclosure.

FIG. 13 is a view for explaining the characteristics of a porous core-shell catalyst structure according to an embodiment of the present disclosure.

FIG. 14 is a view for explaining the characteristics of a porous core-shell catalyst structure according to an embodiment of the present disclosure.

FIG. 15 is a graph for showing an experiment result according to an embodiment of the present disclosure.

DETAILED DESCRIPTION OF THE EMBODIMENTS

Hereinafter, preferable embodiments of the present disclosure will be described in detail with reference to accompanying drawings. However, the spirit and technical scope of the present disclosure is not limited to the embodiments and may be modified variously in many different forms. Rather, the embodiments introduced herein are provided so that the disclosed contents may be thorough and complete, and the spirit of the present disclosure may be sufficiently conveyed to those skilled in the art.

In the present specification, when it is mentioned that a certain component is on another component, it means that the component may be formed directly on another component or that a third component may be interposed therebetween. In addition, the thicknesses of the lines and the sizes of the components shown in the drawings may be exaggerated for clarity and convenience of explanation.

In addition, in various embodiments of the present specification, terms, such as "first", "second", "third", and the like, are used to describe various components, but these components should not be limited by the terms. These terms are only used to distinguish one component from another component. Accordingly, what is referred to as a first component in one embodiment may be referred to as a second component in another embodiment. Each embodiment described and illustrated herein also includes its complementary embodiment.

In the present disclosure, the term "and/or" indicates at least one of components listed before and after.

In the present disclosure, the terms of a singular form may include plural forms unless the context clearly indicates otherwise. In addition, terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In addition, a detailed description of well-known features or functions will be ruled out in order not to unnecessarily obscure the gist of the present disclosure.

FIG. 1 is a flowchart illustrating a method of manufacturing a porous core-shell catalyst structure according to an embodiment of the present disclosure. FIG. 2 is a view illustrating a bulk metal oxide according to an embodiment of the present disclosure. FIG. 3 is a view illustrating a porous metal oxide according to an embodiment of the present disclosure. FIG. 4 is a view illustrating a shell formed of a metal sulfide on the surface of a porous metal oxide according to an embodiment of the present disclosure.

Referring to FIGS. 1 and 2, in operation S100, a bulk metal oxide 110 is prepared.

According to an embodiment, the bulk metal oxide 110 may be spherical in bulk. In addition, there may be substantially no pores or a small amount of pores in the bulk metal oxide 110.

For example, the bulk metal oxide 110 may be a cobalt oxide. In detail, the bulk metal oxide 110 may be $Co_3O_4$. Alternatively, as another example, the bulk metal oxide 110 may include at least one of a titanium oxide ($TiO_2$), a zirconium oxide ($ZrO_2$), a vanadium oxide ($V_2O_5$), a niobium oxide ($Nb_2O_5$), a tantalum oxide ($Ta_2O_5$), molybdenum oxide ($Mn_2O_3$), a tungsten oxide ($WO_3$), a chromium oxide ($Cr_2O_3$), a manganese oxide ($Mn_2O_3$), an iron oxide ($Fe_2O_3$), or a nickel oxide (NiO).

According to an embodiment, the bulk metal oxide 110 may be manufactured by hydrothermal synthesis. As described above, when the bulk metal oxide 110 is a cobalt oxide ($Co_3O_4$), for example, the operation of preparing the bulk oxide 110 may include, an operation of adding 1.25 mmol of cobalt nitrate hexahydrate to a mixture of 50 ml of ammonia water and DI-water (3:1), an operation of adding 1 g of polyvinylpyrrolidone to the mixture and mixing at 600 rpm for 10 minutes, an operation of transferring the mixture to an auto clave and placing it in an oven at a temperature of 180° C. for 8 hours, an operation of washing using a centrifuge after cooling sufficiently, and an operation of drying it in an oven at 60° C. for 4 hours. According to another embodiment, the bulk metal oxide 110 may be manufactured by a scheme other than the above-described scheme.

Referring to FIGS. 1 and 3, in operation S200, a first reaction gas containing nitrogen is provided to the bulk metal oxide 110 to prepare an intermediate product 120 including the porous metal oxide.

When the bulk metal oxide 110 is thermally reduced to the intermediate product 120 by the first reaction gas, oxygen loss may occur in the bulk metal oxide 110. As a result, the bulk metal oxide 110, which is a solid particle having substantially no pores or a trace amount therein, may be converted into the intermediate product 120 having pores in all the particles. Compared to the bulk metal oxide 110, the intermediate product 120 may have a reduced grain size and an increased pore size and surface area. For example, the bulk metal oxide 110 may contain $Co_3O_4$, and the intermediate product 120 may contain CoO.

As described above, when the first reaction gas is provided to the bulk metal oxide 110, the bulk metal oxide 110 may be sequentially converted into a first state intermediate material and a second state intermediate material. In this case, the intermediate product 120 may be the second state intermediate product.

According to an embodiment, as described above, the bulk metal oxide 110 may be sequentially converted into the first state intermediate product and the second state intermediate product. The intermediate product 120 may be the second state intermediate product. In this case, the first state intermediate product may be in a state in which the bulk metal oxide 110 and the porous metal oxide are mixed. That is, as described above, when the bulk metal oxide may be $Co_3O_4$. When the porous metal oxide is CoO, the first state intermediate product may be $Co_3O_4$/CoO and the second state intermediate product may be CoO. Thermal reduction may occur in the bulk metal oxide 110 by providing the first reaction gas. In this case, oxygen loss may occur in the bulk metal oxide 110. At a first reaction temperature, a part of the bulk metal oxide 110 may be converted into the porous metal oxide, and the remaining part of the bulk metal oxide 110 may remain, thereby forming the first state intermediate product. For example, the first reaction temperature may be 290° C.

As described above, after the first state intermediate product is formed at the first reaction temperature, when the process temperature rises to become the second reaction temperature, the first state intermediate product may be converted to the second state intermediate product. For example, the second reaction temperature may be 300° C. The intermediate product 120 may be obtained by converting all of the bulk metal oxide 110 (e.g., $Co_3O_4$) remaining in the first state intermediate product into the porous metal oxide (e.g., CoO). In this case, compared to the first state intermediate product, the grain size of the porous metal oxide in the second state intermediate product may increase, and the surface area and the total pore volume may increase.

In more detail, the operation of preparing the intermediate product 120 may include an operation of loading the bulk metal oxide 110 into a tube furnace in which the first reaction gas environment containing nitrogen is created, an operation of increasing the temperature at 10° C./min to 300° C., an operation of maintain the temperature at 300° C. for 10 minutes, and an operation of providing a gas for removing the first reaction gas to remove the first reaction gas to form the intermediate product 120 after reducing the temperature to room temperature. For example, the porous metal oxide may contain CoO, the bulk metal oxide 110 may contain Co3O4, and the first reaction gas may contain ammonia gas. In addition, the gas for removing the first reaction gas may include nitrogen. As long as it is a gas for removing the first reaction gas, the type of the gas is not limited.

According to an embodiment, as described above, the first state intermediate product including $Co_3O_4$ and CoO may be used as an oxygen generation catalyst for a water decomposition device. In detail, the $Co_3O_4$ in the first state intermediate product may have a spinel structure, and the CoO may have a rock salt structure. The CoO having a rock salt structure may activate $Co_3O_4$ having a spinel structure with high stability and reversibility, so that the oxygen generation catalyst property may be improved. In addition, as described above, the ratio of $Co_3O_4$ and CoO in the first state intermediate product may be controlled according to the temperature and/or time at which the first reaction gas is provided to the bulk metal oxide ($Co_3O_4$) 110, so that an oxygen generation catalyst applicable to various applications may be provided.

Referring to FIGS. 1 and 4, in operation S300, the porous core-shell catalyst structure 130 including the core 132 formed of the porous metal oxide and the shell 134 formed of the metal sulfide is manufactured by providing the second reaction gas containing sulfur to the intermediate product 120.

A heat treatment process may be performed on the intermediate product 120 in the second reaction gas atmosphere.

For example, the heat treatment process may be performed at 270° C., and the second reaction gas may be hydrogen sulfide gas.

In more detail, the operation of preparing the porous core-shell catalyst structure 130 including the core 132 formed of the porous metal oxide and the shell 134 formed of a metal sulfide may include an operation of loading the intermediate product 120 into a tube furnace in which an environment of the second reaction gas is created, an operation of increasing the temperature at 10° C./min to 270° C., an operation of maintaining the temperature at 270° C. for 1 hour, and an operation of providing nitrogen gas as a gas for removing the second reaction gas to remove the second reaction gas after reducing the temperature to room temperature, thereby forming the shell 134 formed of the metal sulfide on the core 132 formed of the porous metal oxide to prepare the porous core-shell catalyst structure 130. For example, the metal sulfide may include CoSx (x>0), and the second reaction gas may include hydrogen sulfide gas. Further, in addition to nitrogen gas, the gas for removing the second reaction gas is not limited as long as it is a gas capable of removing the second reaction gas.

According to an embodiment, the shell 134 may include a first cobalt sulfide and a second cobalt sulfide having a higher sulfur ratio than the first cobalt sulfide. For example, the first cobalt sulfide may include CoS, and the second cobalt sulfide may include $Co_3S_4$. The first cobalt sulfide may have a higher electrocatalytic activity than the second cobalt sulfide. When the first cobalt sulfide in the shell 134 is greater than 82.62% and less than 95.67%, the electrocatalytic activity may be excellent. At the same time, when the second cobalt sulfide in the shell 134 is greater than 4.33% and less than 17.38%, the electrocatalytic activity may be the best. For example, in the shell 134, the first cobalt sulfide may have a ratio of 87.09%, and the second cobalt sulfide may have a ratio of 12.91%.

The ratio of the first cobalt sulfide and the second cobalt sulfide may be controlled by the time and temperature at which the second reaction gas is provided to the intermediate product 120. In detail, as the time increases, the ratio of the second cobalt sulfide may have a higher value than that of the first cobalt sulfide, and as the temperature increases, the ratio of the second cobalt sulfide may be greater than that of the first cobalt sulfide. According to an embodiment, when the operation is performed at 270° C. for one hour, the ratio of the first cobalt sulfide may be 87.09%, and the ratio of the second cobalt sulfide may be 12.91%.

The porous core-shell catalyst structure 130 according to an embodiment of the present disclosure may be used in various fields. In addition, according to the ratio of the first cobalt sulfide (e.g., CoS) and the second cobalt sulfide (e.g., $Co_3S_4$) included in the porous core-shell catalyst structure 130, the efficiency of a device including the porous core-shell catalyst structure 130 and the reaction mechanism may be controlled. According to an embodiment of the present disclosure, as described above, the ratio of the first cobalt sulfide and the second cobalt sulfide may be easily controlled according to the time and temperature at which the second reaction gas is provided to the intermediate product 120. Accordingly, the ratio of the first cobalt sulfide and the second cobalt sulfide in the porous core-shell catalyst structure 130 may be easily controlled depending on the application field, so that a catalyst optimized for the application field may be provided.

According to an embodiment, as described above, as the temperature and time at which the second reaction gas is provided increase, compared to the first cobalt sulfide (e.g., CoS), the ratio of the second cobalt sulfide (e.g., $Co_3S_4$) may be increased. However, under a relatively high-temperature condition (e.g., 400° C.), it may not be easy to precisely control the ratio of the second cobalt sulfide according to the time for which the second reaction gas is provided. That is, under a relatively high-temperature condition, the second cobalt sulfide may not increase linearly as time increases, but may increase rapidly. To the contrary, in a relatively low-temperature condition (e.g., 300t), the ratio of the second cobalt sulfide may not increase rapidly and may increase relatively close to linear according to the time for which the second reaction gas is provided. Accordingly, when a high ratio of the second cobalt sulfide is required in the porous core-shell catalyst structure 130, the second reaction gas may be provided under a relatively high-temperature condition. When it is required to precisely control the ratio of the first and second cobalt sulfides in the porous core-shell catalyst structure 130, the second reaction gas may be provided under a relatively low-temperature condition and the time for which the second reaction gas is provided may be controlled.

According to an embodiment, the bulk metal oxide/porous metal oxide (the first state intermediate product such as $Co_3O_4$/CoO) in which a part of the bulk metal oxide (e.g., $Co_3O_4$) 110 is reduced to the porous metal oxide (e.g., CoO) may have a reduced grain size compared to the bulk metal oxide 110, and the surface area and the total pore volume may increase. The intermediate product (the second state intermediate product) 120, in which the bulk metal oxide/porous metal oxide (the first state intermediate product) is all converted to the porous metal oxide, may have a grain size, a surface area and a total pore volume increased compared to the bulk metal oxide/porous metal oxide (the first state intermediate product). The porous metal oxide/metal sulfide (the porous core-shell catalyst structure 130) in which the surface of the intermediate product 120 is converted to a metal sulfide (e.g., CoSx) may have a grain size and a total pore volume that are slightly reduced and a surface area that is greatly reduced, compared to the intermediate product 120. However, in the porous core-shell catalyst structure (e.g., CoO/$CoS_x$) 130 of the present disclosure, the grain size may be reduced compared to the bulk metal oxide 110, and the surface area and the total pore volume may increase.

As described above, by providing the first reaction gas to the bulk metal oxide 110, the bulk metal oxide 110 may be converted into the porous metal oxide as the intermediate product 120. Thereafter, by providing the second reaction gas to the intermediate product 120, the shell 134, which is formed of the metal sulfide on the surface of the core 132 formed of the porous metal oxide, is formed, thereby manufacturing the porous core-shell catalyst structure 130.

Accordingly, it is possible to exhibit excellent electrocatalytic activity due to the improved electrical conductivity and increased surface area of the porous metal oxide combined with the excellent electrocatalytic activity of the metal sulfide.

In addition, the porous core-shell catalyst structure manufactured according to an embodiment of the present disclosure may have higher efficiency than a catalyst using a conventional material as a material for a dye-sensitized solar cell and an oxygen generating reaction electrode.

Accordingly, the electrocatalytic activity, electrical conductivity, and surface area are increased, and thus a porous core-shell catalyst structure capable of improving power conversion efficiency of a battery may be manufactured.

Hereinafter, a result of evaluation of characteristics of a porous core-shell catalyst structure according to a specific experimental example of the present disclosure will be described.

Preparation of Porous Core-Shell Catalyst Structure According to Experimental Example Cobalt nitrate hexahydrate of 1.25 mmol was added to ammonia water of 50 ml and DI-water (3:1) mixture. Polyvinylpyrrolidone of 1 g was added to the mixture, and further mixed at 600 rpm for 10 minutes. The mixture was transferred to an auto clave and placed in an oven at a temperature of 180° C. for 8 hours. After cooling sufficiently, washing (1 time of DI-water, 1 time of ethanol) was performed by using a centrifuge (7000 rpm, 10 minutes). Thereafter, it was dried in an oven at 6060° C. for 4 hours to synthesize $Co_3O_4$ as a bulk oxide according to the experimental example of the present disclosure.

The Co3O4 synthesized in advance was put into a tube furnace in which an ammonia gas environment was established. The inside of the tube furnace was heated up to 300° C. at a rate of about 10° C./min. After reaching 300° C., it was maintained at 300° C. for 10 minutes. Then, after lowering the temperature to room temperature, nitrogen gas was provided to remove the ammonia gas. Accordingly, CoO was synthesized as an intermediate product, which is a porous metal oxide according to the experimental example of the present disclosure.

The CoO synthesized in advance was put into a tube furnace in which a hydrogen sulfide gas environment was created. The temperature was raised to 270° C. at a rate of about 10° C./min. After reaching 270° C., it was maintained at 270° C. for 1 hour, and after lowering the temperature to room temperature, nitrogen gas was provided to remove the hydrogen sulfide gas. Accordingly, the porous $CoO/CoS_x$ (X>0) core-shell catalyst structure including the core formed of the porous metal oxide and the metal sulfide shell formed on the surface of the core according to the experimental example of the present disclosure was prepared.

FIG. 5 is a view showing an SEM image for explaining the structure of each operation of synthesizing a porous core-shell catalyst structure according to an experimental example of the present disclosure.

Referring to FIG. 5, as described above, (a) of FIG. 5 is a SEM image of $Co_3O_4$ for preparing the porous core-shell catalyst structure. In addition, (b) of FIG. 5 is an SEM image taken by enlarging (a) of FIG. 5, (c) of FIG. 5 is an SEM image for explaining that some $Co_3O_4$ is converted to CoO due to oxygen loss in $Co_3O_4$ by providing ammonia gas to $Co_3O_4$, (d) of FIG. 5 is an SEM image taken by enlarging (c) of FIG. 5, (e) of FIG. 5 is a SEM image of CoO in which all of the $Co_3O_4$ is converted to CoO, (f) of FIG. 5 is an SEM image taken by enlarging (e) of FIG. 5, (g) of FIG. 5 is an SEM image of CoO/CoOx in which $CoS_x$ is formed on the surface of CoO by providing hydrogen sulfide gas to CoO, and (h) of FIG. 5 is an SEM image taken by enlarging (g) of FIG. 5. It may be understood that $Co_3O_4$ was finally converted into $CoO/CoS_x$ for each manufacturing operation according to the experimental example.

FIG. 6 is an XRD pattern graph in various synthesis stages according to a method of manufacturing a porous core-shell catalyst structure according to an experimental example of the present disclosure, wherein the lower side is a graph showing the JCPDS standard.

Referring to FIG. 6, (a) of FIG. 6 is a view illustrating a pattern of $Co_3O_4$ synthesized according to an experimental example of the present disclosure described above. In addition, (b) of FIG. 6 is a view illustrating a pattern of $Co_3O_4/CoO$ partially synthesized with CoO by providing ammonia gas from the $Co_3O_4$, where it may be confirmed that the peak of (b) coincides with $Co_3O_4$ and CoO. That is, it may be confirmed that a part of $Co_3O_4$ is reduced to CoO through a heat treatment using ammonia gas. Further, (c) of FIG. 6 is a view illustrating a pattern of the CoO in which all of the Co3O4 is synthesized into the CoO, where it may be confirmed that the peak of (c) coincides with the CoO. That is, it may be confirmed that all of the $Co_3O_4$ is reduced to the CoO. In addition, (d) of FIG. 6 is a view illustrating a pattern of the CoO/CoSx in which $CoO/CoS_x$ (X>0) is synthesized by providing hydrogen sulfide gas to the CoO. It may be confirmed that the peak of (d) coincides with the CoO and CoSx. That is, it may be confirmed that a part of the CoO is synthesized to the $CoS_x$. As shown in (a) to (d) of FIG. 6, it may be confirmed that the synthesis is completed according to the synthesis stages of the experimental example.

FIGS. 7 to 8 are HRTEM images taken by photographing the particle surfaces according to the synthesis stages of a method of manufacturing a porous core-shell catalyst structure according to an experimental example of the present disclosure.

Referring to FIG. 7, (a) of FIG. 7 is an image of the surface of a Co3O4 particle. As shown in the surface of (a), the $Co_3O_4$ particle may be confirmed. In addition, (b) of FIG. 7 is a surface image of a $Co_3O_4/CoO$ particle in which a part of $Co_3O_4$ is synthesized into CoO. As shown in the surface of (b), particles of Co3O4 and CoO may be confirmed. That is, it may be confirmed that ammonia gas is provided to the Co3O4 particles, so that a part of the Co3O4 is synthesized into the CoO by the ammonia gas. Further, (c) of FIG. 7 is a surface image of the CoO particle in which all the $Co_3O_4/CoO$ particles are synthesized into the CoO. As shown in the surface of (c), CoO particles may be confirmed. That is, it may be confirmed that synthesis of all of the $Co_3O_4$ into the CoO is completed during the time that it is maintained to provide the ammonia gas to the $Co_3O_4/CoO$. In addition, (d) of FIG. 7 is a surface image of $CoO/CoS_x$ particles in which some of the CoO particles are synthesized into CoSx. As shown in the surface of (d), the particles of CoO and $CoS_x$ may be confirmed, and it may be confirmed that the $CoS_x$ is CoS and $Co_3S_4$. That is, it may be confirmed that hydrogen sulfide gas is provided to some of the CoO particles, so that some of the CoO particles are synthesized into the CoS and $Co_3S_4$ particles. As shown in (a) and (b) of FIG. 7, it may be confirmed that the synthesis was completed according to the synthesis step of the experimental example. Referring to FIG. 8, (a) of FIG. 8 is an FFT pattern image of $Co_3O_4$. In addition, (b) of FIG. 8 is an FFT pattern image of $Co_3O_4/CoO$ in which a part of Co3O4 is synthesized into CoO, (c) of FIG. 8 is an FFT pattern image of the CoO in which all of the $Co_3O_4/CoO$ are synthesized into CoO, and (d) of FIG. 8 is an FFT pattern image of $CoO/CoS_x$ in which a part of the CoO is synthesized into $CoS_x$. It may be confirmed that the synthesis is completed according to the synthesis stages of the experimental example.

FIG. 9 is an image of CoO/CoSx using EDS elemental mapping and a graph of weight percentages of Co, O and S for explaining the distribution of Co, O and S of $CoO/CoS_x$ according to an experimental example of the present invention.

Referring to FIG. 9, (a) of FIG. 9 is a TEM image of $CoO/CoS_x$ for using EDS elemental mapping. (b) of FIG. 9 is EDS elemental maps of Co. (c) of FIG. 9 is EDS elemental maps of O, (d) of FIG. 9 is EDS elemental maps of S. (e) of FIG. 9 is a line measuring the weight percentage of CoO/

$CoS_x$. In addition, (f) of FIG. 9 is a graph of the weight percentages of Co, O and S. As shown in (a) to (f) of FIG. 9, the Co and O are distributed throughout the particle, but it may be confirmed that the S is concentrated on the surface of the particle. That is, it may be confirmed that the porous core-shell structure having the CoO core and $CoS_x$ shell according to an experimental example of the present disclosure is manufactured.

FIG. 10 is a graph showing the ratio of CoS and $Co_3S_4$ of a CoS shell according to the temperature and time at and for which the second reaction gas is provided according to the experimental example of the present disclosure.

Referring to FIG. 10, it may be confirmed that the CoS of the CoS maintained at 270° C. for 1 hour according to the experimental example of the present disclosure has a ratio of 87.08%, and the $Co_3S_4$ has a ratio of 12.91%. As shown in FIG. 10, it may be confirmed that the CoS maintained at 300° C. for 1 hour has 58.24%, the $Co_3O_4$ has 41.76%, and the CoS maintained at 400° C. for 1 hour has 28.66%, and the $Co_3S_4$ has 71.34%. It may be confirmed that the CoS maintained at 300° C. for 10 minutes has 95.67%, and the $Co_3S_4$ has 4.33%. When maintained at 400° C. for 10 minutes, it may be confirmed that the CoS has 68.81% and the $Co_3S_4$ has 31.19%. In addition, when maintained at 300° C. for 30 minutes, it may be confirmed that the CoS has 82.62%, and the $Co_3S_4$ has 17.38%. When maintained at 400° C. for 30 minutes, it may be confirmed that the CoS has 67.27% and the $Co_3O_4$ has 32.73%. That is, as shown in FIG. 10 and following Table 1, it may be confirmed that the value of $Co_3O_4$ increases as the temperature increases when maintained for the same time, and the value of $Co_3O_4$ increases as time increases when maintained at the same temperature.

TABLE 1

| Heat treatment temperature | Heat treatment time | Ratio of CoS (%) | Ratio of $Co_3S_4$ (%) |
|---|---|---|---|
| 270° C. | 1 h | 87.09 | 12.91 |
| 300° C. | 10 min | 95.67 | 4.33 |
| 300° C. | 30 min | 82.62 | 17.38 |
| 300° C. | 1 h | 58.24 | 41.76 |
| 400° C. | 10 min | 68.81 | 31.19 |
| 400° C. | 30 min | 67.27 | 32.73 |
| 400° C. | 1 h | 28.66 | 71.34 |
| 450° C. | 10 min | 82.46 | 17.54 |

FIG. 11 is a graph for explaining the $N_2$ physisorption isotherms graph and pore size distribution of $Co_3O_4$, CoO and $CoO/CoS_x$ particles according to an experimental example of the present disclosure.

Referring to FIG. 11, the surface areas of $Co_3O_4$, CoO and $CoO/CoS_x$ particles were measured. It may be confirmed that there is substantially no change in the slope of the graph of $Co_3O_4$. However, it may be confirmed that the surface area increased by 12 times or more when converted to CoO and the pore size was between 2 and 20 nm. By $N_2$ physisorption measurement, it may be confirmed that spherical particles composed of the crystals of CoO and having internal porosity were formed. The formation of $CoS_x$ on the surface of the CoO resulted in a decrease in the surface area, but the surface area increased by about 5 times compared to conventional $Co_3O_4$. While providing a hydrogen sulfide gas, small pores merge with each other to form large pores, so there is little change in the volume of pores, but the surface area is considerably reduced. In addition, it may be confirmed that the total pore volume decreased by 17%, but the average pore diameter increased from 9.6 nm to 20.2 nm.

TABLE 2

|  | Grain Size (nm) | Surface area ($m^2g^{-1}$) | Total pore volume ($cm^3g^{-1}$) |
|---|---|---|---|
| $Co_3O_4$ | 91.2 | 2.28 | 0.016 |
| $Co_3O_4$/CoO | 25.4 ($Co_3O_4$) 4.8 (CoO) | 8.30 | 0.025 |
| CoO | 13.3 | 27.64 | 0.066 |
| $CoO/COS_x$ | 12.7 | 10.79 | 0.055 |

FIG. 12 shows a JV curve and $CoO/CoS_x$ of a dye-sensitized solar cell (DSSC) having a counter electrode (CE) composed of $CoO/CoS_x$, $Co_3O_4$, CoO and Pt, and Nvquist plots of a symmetric dummy cell having a counter electrode composed of Pt.

Referring to FIG. 12, a dye-sensitized solar cell having a counter electrode including $CoO/CoS_x$, $Co_3O_4$, CoO and Pt, respectively was manufactured. In addition, (a) of FIG. 12 shows that a dye-sensitized solar cell (DSSC) equipped with a counter electrode (CE) composed of $Co_3O_4$ has a power conversion efficiency (PCE) of 3.92%. This is due to the low iodine reduction reaction (IRR) activity of the Co3O4, and it may be understood that the PCE of DSSC is improved to 4.65% when the porous CoO is used as the CE, but the IRR activity of the CoO has a lower value than that of the Pt. However, it may be confirmed that the $CoO/COS_x$ is 7.27%, which significantly improves PCE and has a higher value than Pt. (b) of FIG. 12 is an EIS analysis graph of symmetric dummy cells. The $CoO/CoS_x$ has equivalent series resistance, charge transfer resistance, and Nernst diffusion impedance similar to Pt. Referring to (a) and (b) of FIG. 12, it may be confirmed that $Coo/CoS_x$ has excellent electrode catalytic activity against an iodine reduction reaction (IRR).

FIG. 13 is a graph of comparing electrode catalytic activity of an electrode made of a porous CoO core/CoSx shell catalyst structure and a Pt electrode according to an experimental example of the present disclosure.

Referring to FIG. 13, (a) of FIG. 13 shows a measurement of cyclic voltammongrams of Pt and $CoO/CoS_x$ at a rate of 10 $mVs^{-1}$. Through (b) of FIG. 13, it may be confirmed that the diffusion coefficients are calculated from the linear proportion of the square root of the peak current versus the scan rave using the Randles-sevcik equation and the coefficients are $3.89 \times 10^{-6}$ and $2.71 \times 10^{-6}$ $cm^2$ s for the Pt and $CoO/CoS_x$, respectively.

TABLE 3

| CE | $J_{sc}$ (mA·$cm^2$) | $V_{oc}$ (V) | FF | PCE (%) |
|---|---|---|---|---|
| $Co_3O_4$ | 8.8 ± 0.3 | 0.78 ± 0.02 | 0.57 ± 0.04 | 3.79 ± 0.06 |
| CoO | 13.5 ± 0.7 | 0.68 ± 0.01 | 0.48 ± 0.02 | 4.49 ± 0.14 |
| $CoO/CoS_x$ | 15.5 ± 0.3 | 0.73 ± 0.01 | 0.66 ± 0.02 | 7.27 ± 0.06 |
| Pt | 15.9 ± 0.2 | 0.70 ± 0.01 | 0.65 ± 0.01 | 7.12 ± 0.05 |

FIG. 14 is a graph of comparing the catalytic activity of $CoO/CoS_x$ according to OER according to the experimental example of the present disclosure with $Co_3O_4$, CoO and $IrO_2$ catalyst states.

Referring to FIG. 14, (a) of FIG. 14 is iR-compensated polarization curves recorded at a sweep rate of 10 mVs−1, and the Co3O4 is a bare glassy carbon (GC), combining glass and ceramic properties with graphite. Free carbon) Shows a higher current density than that of an electrode. It may be confirmed that the CoO has an improved value in current density due to a high Co content and a large surface area. The CoO/CoS$_x$ has better performance than the IrO$_2$. At a current density of 10 mAcm$^{-2}$, the overpotential of CoO/CoS$_x$ is 303 mV, which is lower than the overpotential value of IrO$_2$ by 41 mV. In addition, (b) of FIG. 14 is a graph of the exchange current density (j$_0$) and the Tafel slope measured by using a Tafel plot of each catalyst. The Tafel slope of Co$_3$O$_4$ was 117 mVdec$^{-1}$, the Tafel slope of Co$_3$O$_4$ was 117 mVdec$^{-1}$, and the Tafel slopes of CoO, CoO/CoS$_x$ and IrO$_2$ were 96, 58, and 65 mVdec$^{-1}$, respectively. For each catalyst, the OER has different rate determining stages. In particular, when the Tafel slopes of CoO/CoS$_x$ and IrO$_2$ approach the Tafel slope value of 60 mVdec$^{-1}$, the OER velocities of the two catalysts depend on the equilibrium between OH adsorption and O—O bonding in the active state.

FIG. 15 is a graph for explaining the activities of Co$_3$O$_4$, CoO, porous CoO core/CoS$_x$ shell, and IrO$_2$ according to an experimental example of the present disclosure.

In addition, (a) and (b) of FIG. 15 are graphs of ECSA and charge transfer resistance (R$_{et}$) of each catalyst measured by analyzing CV and EIS spectra. The CoO/CoS$_x$ is measured as 4.70 cm$^2$, but the CoO and Co$_3$O$_4$ have values of 0.54 cm$^2$ and 0.58 cm$^2$, respectively. The charge transfer resistance (R$_{et}$) value of the CoO/CoS$_x$ calculated through the EIS spectrum analysis is as low as 21.77Ω cm$^2$ and has a lower value than those of CoO and Co$_3$O$_4$. Accordingly, it may be confirmed that the surface formed on the CoO/CoS$_x$ is substantially active in OER.

As described above, although the present disclosure has been described in detail using preferred embodiments, the scope of the present disclosure is not limited to specific embodiments, and should be interpreted by the appended claims. In addition, it should be understood that various modifications and alterations can be made from the disclosures above by a person having ordinary skill in the art, without departing from the scope of the present disclosure.

What is claimed is:

1. A method of manufacturing a porous core-shell catalyst structure, the method comprising:
   preparing a bulk cobalt oxide having a first oxygen content;
   providing a first reaction gas containing nitrogen to the bulk cobalt oxide to produce an intermediate product containing a porous cobalt oxide, wherein the intermediate product has a second oxygen content that is lower than the first oxygen content; and
   providing a second reaction gas containing sulfur to the intermediate product to produce a porous core-shell catalyst structure including a core formed of the porous cobalt oxide and a shell formed of cobalt sulfide.

2. The method of claim 1, wherein
   the shell includes (a) a first cobalt sulfide having a first sulfur ratio and (b) a second cobalt sulfide having a second sulfur ratio that is higher than the first sulfur ratio, and
   a ratio of the first cobalt sulfide and a ratio of the second cobalt sulfide are controlled by a time and a temperature at which the second reaction gas is provided to the intermediate product.

3. The method of claim 1, wherein the first reaction gas includes an ammonia gas.

4. The method of claim 1, wherein the second reaction gas includes a hydrogen sulfide gas.

5. The method of claim 1, wherein, in the core-shell catalyst structure, a ratio of the core and the shell is controlled by time and temperature with which the second reaction gas is provided to the intermediate product.

6. A method of manufacturing a dye-sensitized solar cell, the method comprising:
   preparing the porous core-shell catalyst structure according to claim 1;
   forming a photoelectric conversion layer including an electrode particle and a dye layer adsorbed on a surface of the electrode particle on a first substrate;
   forming a guide film on a second substrate by pretreating the second substrate with a basic solution;
   forming an electrode film using the porous core-shell catalyst structure on the guide film;
   arranging the first substrate and the second substrate so that the electrode film and the photoelectric conversion layer face each other; and
   injecting an electrolyte solution between the first substrate and the second substrate.

7. A method of manufacturing a porous core-shell catalyst structure, the method comprising:
   preparing a bulk cobalt oxide having a first oxygen content;
   providing a first reaction gas containing nitrogen to the bulk cobalt oxide to produce an intermediate product that consists essentially of a porous cobalt oxide and that has a second oxygen content that is lower than the first oxygen content; and
   providing a second reaction gas containing sulfur to the intermediate product to produce a porous core-shell catalyst structure including a core formed of the porous cobalt oxide and a shell formed of cobalt sulfide.

8. A method of manufacturing a porous core-shell catalyst structure, the method comprising:
   preparing a bulk cobalt oxide having a first oxygen content;
   converting, at a first reaction temperature, and using a first reaction gas that includes nitrogen, a first portion of the bulk cobalt oxide to a first porous cobalt oxide having a rock salt structure with a first grain size, thereby producing a first state intermediate product comprising a mixture of the first porous cobalt oxide and a remaining portion of the bulk cobalt oxide, the remaining portion having a spinel structure;
   converting, at a second reaction temperature that is higher than the first reaction temperature, the remaining portion of the bulk cobalt oxide to a second porous cobalt oxide having a second grain size that is larger than the first grain size; and
   providing a second reaction gas containing sulfur to the second porous cobalt oxide to produce a porous core-shell catalyst structure including a core that includes the second porous cobalt oxide and a shell formed of cobalt sulfide.

9. The method of claim 8, wherein:
   the bulk cobalt oxide is Co$_3$O$_4$; and
   the first and second porous cobalt oxides are CoO.

10. The method of claim 8, wherein the shell includes (a) a first cobalt sulfide having a first sulfur ratio and (b) a second cobalt sulfide having a second sulfur ratio that is higher than the first sulfur ratio.

11. The method of claim 8, wherein the shell includes (a) a first cobalt sulfide having a first electrocatalytic activity and (b) a second cobalt sulfide having a second electrocatalytic activity that is less than the first electrocatalytic activity.

12. The method of claim 8, wherein the shell includes (a) a first cobalt sulfide having a first electrocatalytic activity that is greater than 82.62% and less than 95.67%, and (b) a second cobalt sulfide having a second electrocatalytic activity that is greater than 4.33% and less than 17.38%.

13. The method of claim 8, wherein providing the second reaction gas containing sulfur to the second porous cobalt oxide comprises:
- in a reaction chamber, providing the second reaction gas to the second porous cobalt oxide during a temperature increasing operation;
- after the temperature increasing operation, providing the second reaction gas to the second porous cobalt oxide during a temperature maintaining operation;
- after the temperature maintaining operation, performing a temperature reduction operation; and
- after the temperature reduction operation, providing nitrogen gas to remove the second reaction gas from the reaction chamber.

* * * * *